(12) United States Patent
Van Campfort et al.

(10) Patent No.: US 10,174,638 B2
(45) Date of Patent: Jan. 8, 2019

(54) DEVICE FOR EXPANDING STEAM AND METHOD TO CONTROL SUCH A DEVICE

(71) Applicant: ATLAS COPCO AIRPOWER, NAAMLOZE VENNOOTSCHAP, Wilrijk (BE)

(72) Inventors: Kris Van Campfort, Wilrijk (BE); Kristof Pascal Hubin, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 0 days.

(21) Appl. No.: 15/312,038

(22) PCT Filed: May 11, 2015

(86) PCT No.: PCT/BE2015/000020
§ 371 (c)(1),
(2) Date: Nov. 17, 2016

(87) PCT Pub. No.: WO2015/176142
PCT Pub. Date: Nov. 26, 2015

(65) Prior Publication Data
US 2017/0107862 A1    Apr. 20, 2017

(30) Foreign Application Priority Data

May 19, 2014  (BE) .................................. 2014/0373

(51) Int. Cl.
*F01K 13/02*    (2006.01)
*F01K 7/16*     (2006.01)
(Continued)

(52) U.S. Cl.
CPC ................ *F01K 13/02* (2013.01); *F01K 7/16* (2013.01); *H02K 7/102* (2013.01); *H02K 7/1823* (2013.01); *H02P 3/025* (2013.01); *H02P 3/24* (2013.01)

(58) Field of Classification Search
CPC . F01K 25/08; F01K 7/24; F01K 7/165; F01K 7/20; F01K 13/02; F01K 3/22;
(Continued)

(56) References Cited

U.S. PATENT DOCUMENTS

| 4,873,827 A | 10/1989 | Hadano et al. | |
| 2014/0208750 A1* | 7/2014 | Vermeersch | ............ F01K 13/02 60/646 |

FOREIGN PATENT DOCUMENTS

| CN | 102052098 A | 5/2011 |
| CN | 102674487 A | 9/2012 |

(Continued)

OTHER PUBLICATIONS

International Search Report (ISR) dated Oct. 2, 2015, for PCT/BE2015/000020.
(Continued)

*Primary Examiner* — Mark Laurenzi
*Assistant Examiner* — Mickey France
(74) *Attorney, Agent, or Firm* — Bacon & Thomas, PLLC

(57) ABSTRACT

A device for expanding steam, whereby this device comprises an expander with an inlet that is connected to an inlet pipe and an outlet that is connected to an outlet pipe, whereby the inlet pipe is provided with an inlet valve and the outlet pipe is provided with an outlet valve for isolating the space between the valves, by closing these valves when the expander is not operating, whereby the device is provided
(Continued)

with a steam supply that conditions the space between the valves when the expander is not operating, such that no air can penetrate into the space.

22 Claims, 2 Drawing Sheets

(51) Int. Cl.
*H02K 7/102* (2006.01)
*H02K 7/18* (2006.01)
*H02P 3/02* (2006.01)
*H02P 3/24* (2006.01)

(58) Field of Classification Search
CPC ... F01K 7/16; F01K 7/40; F01K 9/023; F01D 19/02; F01D 11/04; F01D 11/06; F01D 17/24; F01D 17/00; F01D 17/18; Y02E 20/16; F22B 35/14
USPC .......................... 60/646, 657, 660, 662, 667
See application file for complete search history.

(56) References Cited

FOREIGN PATENT DOCUMENTS

| | | |
|---|---|---|
| DE | 10339881 B3 | 12/2004 |
| EP | 1510660 A1 | 3/2005 |
| EP | 2607634 A1 | 6/2013 |
| JP | 60204907 A | 10/1985 |
| JP | 6336004 A | 2/1988 |
| JP | S63-42802 U | 3/1988 |
| JP | 03115705 A | 5/1991 |
| WO | 2014/123572 A1 | 8/2014 |

OTHER PUBLICATIONS

Written Opinion dated Oct. 2, 2015, for PCT/BE2015/000020.
Written Opinion dated Feb. 11, 2016, for PCT/BE2015/000020.
JP Office Action in related JP Application No. 2016-568646, dated Jun. 25, 2018.

* cited by examiner

DEVICE FOR EXPANDING STEAM AND METHOD TO CONTROL SUCH A DEVICE

The present invention relates to a device for expanding steam.

Steam here means water vapour or any other form of a two phase gas.

More specifically the invention concerns a device for expanding steam, whereby this device comprises an expander with a rotor for converting steam energy into mechanical energy on the shaft of the rotor, whereby this expander comprises an inlet that is connected to an inlet pipe for steam and comprises an outlet that is connected to an outlet pipe for steam, whereby the inlet pipe is provided with an inlet valve and the outlet pipe is provided with an outlet valve for isolating the space between the inlet valve and the outlet valve, that contains the expander, by closing these valves when the expander is not operating.

BACKGROUND OF THE INVENTION

It is known that such devices expand high pressure steam to lower pressure steam and thereby generate mechanical or electrical energy.

During operation the inlet valve and outlet valve are open and the device is completely under steam.

When the device is stopped, for example because there is no demand for steam or energy or because there are fault conditions, this inlet and outlet valve are closed and steam is confined in the device, more specifically in the space between these two valves that contains the expander.

This confined steam cools to ambient temperature and due to the properties of the steam the pressure in the aforementioned space will fall and a strong vacuum will be created between the inlet valve and the outlet valve.

As a result air can be drawn into the device, for example through the seals in the steam expand or in the valves or other places.

The combination of air and steam condensate in the device creates a highly corrosive environment to which the components of the device and thus the expander are exposed.

This has the disadvantage that the lifetime of these components is drastically reduced.

Moreover, this has detrimental consequences for the reliability of the device.

An additional disadvantage is that corrosion of the expander itself can make the efficiency fall, such that less energy is produced once the machine is started up again.

An additional disadvantage is that the air in the device can also cause problems downstream in the outlet pipe, as corrosion of the pipes and equipment can occur when the unit is started up again, and efficiency loss in the process due to reduced heat transfer in heat exchangers for example.

SUMMARY OF THE INVENTION

The purpose of the present invention is to provide a solution to at least one of the aforementioned and other disadvantages.

The object of the present invention is a device for expanding steam, whereby this device comprises an expander with a rotor for converting steam energy into mechanical energy on the shaft of the rotor, whereby this expander comprises an inlet that is connected to an inlet pipe for steam and comprises an outlet that is connected to an outlet pipe for steam, whereby the inlet pipe is provided with an inlet valve and the outlet pipe is provided with an outlet valve for isolating the space between the inlet valve and the outlet valve, that contains the expander, by closing these valves when the expander is not operating, whereby the device is further provided with a steam supply that provides the aforementioned space between the inlet valve and the outlet valve with steam at an overpressure when the expander is not operating.

Overpressure here means a pressure that is higher than the ambient pressure of the expander, which in many cases is the local atmospheric pressure.

An advantage is that the aforementioned space is placed under an overpressure and no vacuum occurs and thus no air can get into the device.

Consequently the risk of a corrosive environment in the device is kept to a minimum, such that the negative consequences attached to this can be limited.

Preferably the steam supply is provided with a supply valve that is connected to a controller that opens the supply valve when the expander is taken out of operation and which closes the supply valve again when the expander is put back in operation.

This has the advantage that the steam supply will only be provided when the expander is taken out of operation, in other words only at the times when necessary to prevent corrosion or other detrimental consequences of drawing in air.

In a practical embodiment the expander is provided with a drainpipe for draining off condensate, with the advantage that no condensate can accumulate in the expander that can detrimentally affect the good operation of the expander.

In a preferred embodiment the steam supply is formed by a steam supply pipe that taps off steam from the inlet pipe upstream from the inlet valve and/or downstream from the outlet pipe of the outlet valve.

This has the advantage that the steam already available in the inlet or outlet pipe can be used and that no extra steam has to be produced separately.

Of course the steam from the outlet pipe downstream from the outlet valve can only be used if this steam is at a sufficient pressure, which means that the pressure in the outlet pipe must at least be greater than the pressure in the aforementioned space between the two valves and preferably greater than the ambient pressure.

According to a preferred characteristic of the invention the device is provided with at least one pressure and/or temperature sensor whose signal is connected to the controller and on the basis of which the controller will open or close the supply valve more or less to obtain an overpressure in the space between the inlet valve and the outlet valve.

An advantage of this is that the quantity of steam required to keep the space at an overpressure will be supplied.

In a practical embodiment means are preferably provided that prevent the rotor of the expander from being driven by the steam supply when the expander is not operating.

This has the advantage that the rotor cannot come into operation undesirably when not in use.

The invention also concerns a method for controlling a device for expanding steam according to the invention, whereby this device comprises an expander with an inlet that is connected to an inlet pipe and an outlet that is connected to an outlet pipe and a rotor for converting steam energy into mechanical energy on the shaft of the rotor, whereby the method comprises the step of closing the inlet valve and the outlet valve when the expander is not operating, characterised in that during the aforementioned step the method consists of supplying steam to the closed space between the inlet valve and the outlet valve that contains the expander.

BRIEF DESCRIPTION OF THE DRAWINGS

With the intention of better showing the characteristics of the invention, a few preferred embodiments of a device according to the invention are described hereinafter by way of an example, without any limiting nature, with reference to the accompanying drawings, wherein.

DETAILED DESCRIPTION OF THE INVENTION

Figure 1:
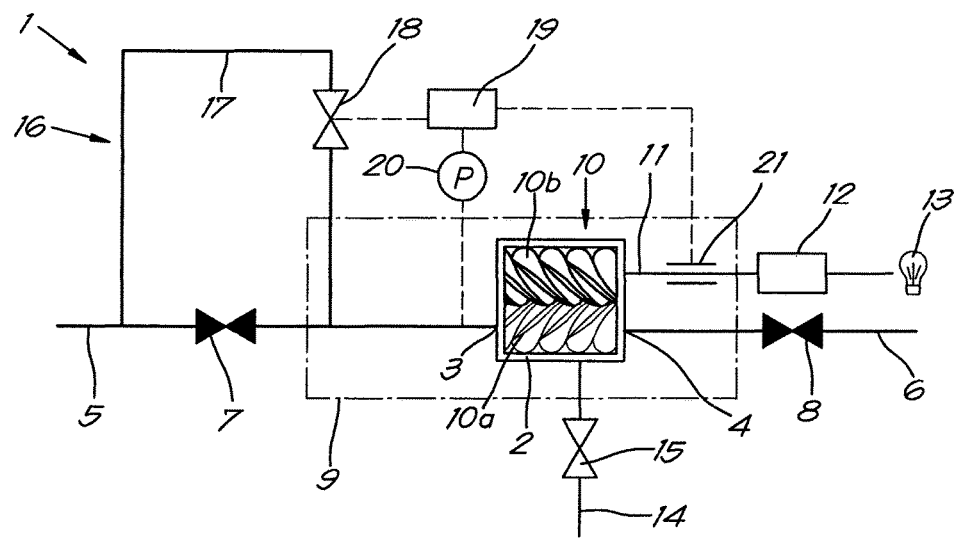
FIG. 1 schematically shows a device according to the invention.

The device shown in FIG. 1 essentially comprises an expander 2 with an inlet 3 and outlet 4.

The inlet 3 is connected to an inlet pipe 5 for steam, for example originating from a steam generator or industrial process, the outlet 4 is connected to an outlet pipe 6 for steam, for example for the supply of an industrial process.

The inlet pipe 5 is provided with an inlet valve 7 while the outlet pipe 6 is provided with an outlet valve 8.

The space 9 between the two valves 7, 8 contains the expander.

In this case the expander 2 is a screw expander 2 with a rotor 10, in this case a double rotor 10, with a female rotor 10a and a male rotor 10b that are provided with lobes that mesh together.

The male rotor 10b is fastened to a shaft 11 that drives a generator 12. The generator 12 is connected to electricity consumers 13.

The expander 2 is provided with a drainpipe 14 for condensate. In this case the drainpipe 14 is provided with a controlled valve 15, but this can also be a condensate separator for example.

Furthermore a steam supply 16 is provided in the form of a steam supply pipe 17 that forms a direct bypass of the inlet valve 7, and thereby connects to the inlet pipe 5 upstream from the inlet valve 7 on the one hand, and connects to the inlet pipe 5 downstream from the inlet valve 7 on the other.

The steam supply pipe 17 is provided with a supply valve 18, which in this case is constructed as a control valve 18.

A controller 19 is also provided that is connected to the control valve 18 and to a pressure sensor 20 to measure the pressure in the aforementioned space 9, in this case at the level of the inlet 3 of the expander 2.

The device 1 is further provided with means to prevent the double rotor 10 from being able to come into operation undesirably while the expander 2 is not operating.

In the case of FIG. 1 these means are formed by a mechanical brake 21 that can be activated or deactivated by the controller 19.

It is not excluded that the controller 19 is also connected to the aforementioned controlled valve 15 in the drainpipe 14.

The operation of the device 1 is very simple and as follows.

To drive the generator 12 the inlet valve 7 and the outlet valve 8 are opened such that the expander 2 is supplied with steam originating from a steam generator for example to which the inlet pipe 5 is connected.

As a result the double rotor 10 of the expander 2 is driven, whereby the steam undergoes an expansion and the steam energy is converted into mechanical energy on the shaft 11 of the male rotor 10b to which the generator 12 is connected.

The generator 12 will produce electrical energy that can be supplied to electricity consumers 13.

The expanded steam is removed via the outlet 4 of the expander 2 using the outlet pipe 6 to a production process located downstream or is fed back to the steam generator. This steam can also be led to steam consumers.

When temporarily there is no demand for steam or energy, the expander 2 is taken out of operation by closing the inlet valve 7 and the outlet valve 8, as shown in FIG. 1, such that the aforementioned space 9 between the inlet valve 7 and the outlet valve 8 is closed off.

The steam in this space 9 will cool in the course of time, such that the pressure will fall and a vacuum will be created.

In order to counteract this, steam is supplied to the space 9 by opening the supply valve 18 more or less on the basis of the control signals that are generated by the controller 19, whereby the controller ensures that an overpressure always prevails in the space 9 with respect to the environment so that infiltration of air from the outside is prevented.

To this end the controller continuously or alternately determines the difference between the pressure in the aforementioned space 9 and the ambient pressure.

On the basis of the difference the controller 19 determines whether and when steam must be supplied and how much steam must be supplied in order to maintain the space 9 at an overpressure with respect to the environment.

To this end, on the basis of these measurements the controller 19 will open the supply valve 18 more or less and supply steam to the space 9 at the level of the inlet 3 of the expander 2 via the steam supply pipe 17 in order to obtain an overpressure in the aforementioned space 9.

As the steam supplied originates from the supply pipe 17, which supplies unexpanded steam, the steam will be at an overpressure with respect to the steam in the aforementioned space 9.

In this case the overpressure is maintained at a set value by the controller 19, for example at 1 kilopascal above ambient pressure.

By creating an overpressure in the aforementioned space 9 with respect to the ambient pressure, no air can penetrate into this space 9 and consequently the expander 2.

As a result a corrosive environment will not occur and the detrimental consequences coupled to this are prevented.

The condensate that occurs is removed via the drainpipe 14 for condensate by opening the controlled valve 15.

It is not excluded that during the operation of the expander 2 the controlled valve 15 is opened to remove condensate.

In this way an accumulation of condensate in the expander 2 can be prevented.

Furthermore it is also possible that the controlled valve 15 is controlled by the controller 19.

In order to prevent the double rotor 10 coming into operation due to the steam supplied, which is undesirable when the expander 2 is not operating, the controller 19 will activate the brake 21 on the shaft 11 of the double rotor 10 while the expander 2 is not operating.

When there is a demand for steam or energy again, the inlet valve 7 and the outlet valve 8 can be opened again and the expander 2 can come back into operation.

The controller 19 will then close the supply valve 18 and deactivate the brake 21.

Figure 2:
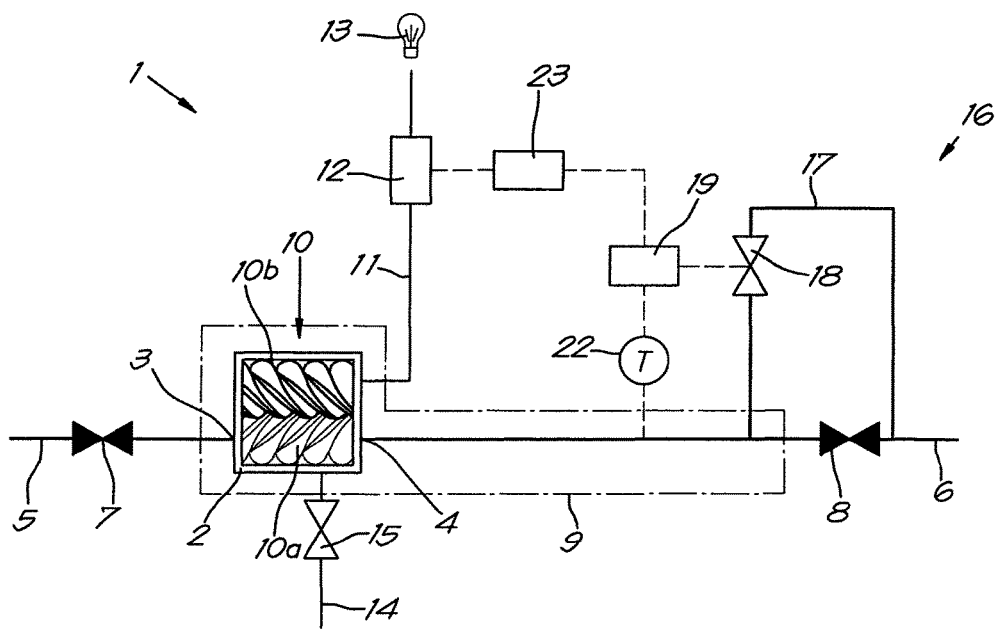
FIGS. 2 and 3 each schematically show an alternative embodiment of the device of FIG. 1.

FIG. 2 shows an alternative second embodiment.

The device differs from the device 1 previously described by the steam supply 16 now being formed by a steam supply pipe 17 that taps off steam from the outlet pipe 6 downstream from the outlet valve 8, via a direct bypass across the outlet valve 8, and supplies this to the space 9 between the inlet valve 7 and the outlet valve 8, in this case at the level of the outlet 4 of the expander 2.

In this case the pressure sensor 20 is replaced by a temperature sensor 22 at the location of the outlet 4, whereby this temperature sensor 22 enables the controller 19 to indirectly determine the pressure in the space 9.

After all there is an unequivocal link between pressure and temperature in the case of saturated steam.

Furthermore, the mechanical brake 21 is replaced by a supply 23 that is coupled to the generator 12 in order to, if necessary, inject direct current into the generator to block the rotation of it.

The operation of the device 1 of FIG. 2 is analogous to the operation of the device 1 of FIG. 1, only the steam supply 16 will supply steam to the outlet 4 of the expander 2, whereby the steam originates from the outlet pipe 6.

This is possible when the pressure in the outlet pipe 6 is greater than the pressure in the aforementioned space 9.

The controller 19 will control the supply valve 18 on the basis of the measurements by the temperature sensor 22.

In order to prevent the shaft 11 of the double rotor 10 coming into operation due to the steam supplied, in this case use is made of the battery 23 which will apply direct current to the windings of the generator 12.

As a result the generator 12 is used as a brake as it were on the shaft 11 of the double rotor 10.

It is possible to use another power source than a battery 23 in order to apply direct current to the windings of the generator 12.

Figure 3:
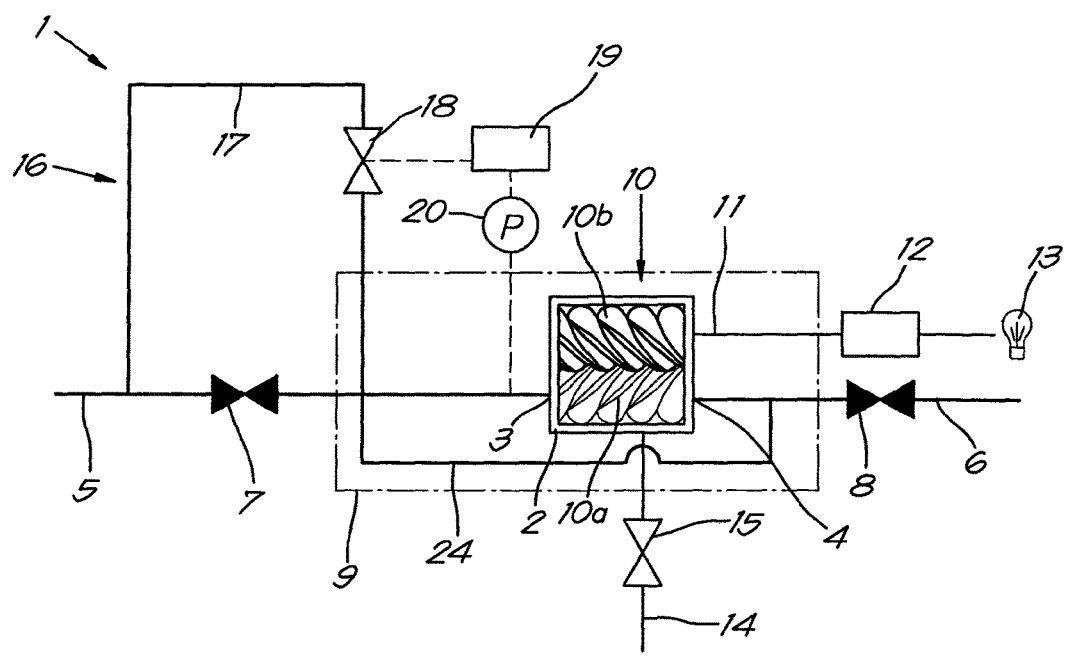

FIG. 3 shows another variant of the device 1 of FIG. 1.

This device 1 is identical to the first embodiment, but is also provided with an extra steam pipe 24 which forms a bypass between a connection point in the aforementioned space 9 that is located at the level of the inlet 3 and a connection point in the aforementioned space 9 that is located at the level of the outlet 4.

Furthermore, the means to counteract the rotation of the double rotor 10, as a replacement of the brake 21, are realised by the fact that steam at the same pressure is supplied on both sides of the expander 2, such that no steam can flow through the expander.

The operation is analogous to the operation of the first embodiment.

When in this case the supply valve 18 is opened by the controller 19, there will be a steam supply during the stoppage of the expander 2 at both the inlet 3 and the outlet 4 of the expander 2.

As a result both sides of the expander 2 will be placed under pressure simultaneously, which prevents the double rotor 10 of the expander 2 coming into operation due to a pressure difference between the two sides.

It is not excluded in this embodiment that the steam supply pipe 17 taps off steam from the outlet pipe 6 instead of the inlet pipe 5.

In order to prevent the expander 2 coming into operation, it could be chosen for example to select the flow rate that the supply valve 18 allows through to be as small as possible, such that it is insufficient for driving the double rotor 10.

It is clear that in each of the embodiments described, one or more of the means described for preventing the double rotor 10 from being driven by the steam supply 16 can be used.

Furthermore it is also clear that in each of the embodiments described, one or more pressure sensors 20 and/or one or more temperature sensors 22 can be provided at different suitable locations both at the level of the inlet 3 and the outlet 4.

Furthermore, it is also clear that the screw expander 2 can also be another type of expander or a turbine or similar for example.

It is also clear that it is not excluded that the device 1 also operates without a supply valve 18 and without a controller 19, whereby the supply valve 18 is replaced by a calibrated opening for example which, when closing the inlet valve 7 and outlet valve 8, allows a sufficient steam flow through to ensure that the pressure in the space 9 is always at an overpressure with respect to the environment.

It is also possible that the supply valve 18 is combined with the inlet valve 7 or the outlet valve 8. Or in other words: the inlet valve 7 and/or the outlet valve 8 acts as the supply valve 18 and during stoppage will also be controlled by the controller 19.

The present invention is by no means limited to the embodiments described as an example and shown in the drawings, but a device for expanding steam and a method for controlling such a device can be realised in different variants without departing from the scope of the invention.

The invention claimed is:

1. A device for expanding steam, whereby this device comprises an expander with a rotor for converting steam energy into mechanical energy on the shaft of the rotor, whereby this expander comprises an inlet that is connected to an inlet pipe for steam and an outlet that is connected to an outlet pipe for steam, whereby the inlet pipe is provided with an inlet valve and the outlet pipe is provided with an outlet valve for isolating the space between the inlet valve and the outlet valve, that contains the expander, by closing these valves when the expander is not operating, wherein the device is further provided with a steam supply that conditions the aforementioned space between the inlet valve and the outlet valve when the expander is not operating, in such a way that no air can penetrate into the aforementioned space and, whereby the steam supply is formed by a steam supply pipe that taps off steam from the inlet pipe upstream from the inlet valve and/or the outlet pipe downstream from the outlet valve.

2. The device according to claim 1, wherein the steam supply is supplied with a supply valve that is connected to a controller that opens the supply valve when the expander is taken out of operation and which closes the supply valve again when the expander is put back in operation.

3. The device according to claim 2, wherein the supply valve is a control valve, with which the overpressure in the space between the inlet valve and the outlet valve can be controlled.

4. The device according to claim 1, wherein the expander is provided with a drainpipe for draining off condensate.

5. The device according to claim 4, wherein the drainpipe is provided with a condensate separator or a controlled valve.

6. The device according to claim 1, wherein the steam supply pipe forms a direct bypass across the inlet valve and/or across the outlet valve.

7. The device according to claim 2, wherein the device is provided with at least one pressure sensor and/or temperature sensor whose signal is connected to the controller and on the basis of which the controller will open and close the supply valve more or less to obtain an overpressure in the space between the inlet valve and the outlet valve.

8. The device according to claim 7, wherein the controller is such that the overpressure is kept at a set value.

9. The device according to claim 1, wherein the expander is a screw expander.

10. The device according to claim 1, wherein means are provided that prevent the rotor of the expander from being driven by the steam supply while the expander is not operating.

11. The device according to claim 2, wherein the aforementioned means consist of the supply valve allowing through a flow that is insufficient for driving the rotor of the expander.

12. The device according to claim 1, wherein the means consist of steam being supplied to the aforementioned space, both at the level of the inlet, and of the outlet.

13. The device according to claim 10, wherein the aforementioned means are formed by a brake on the shaft of the rotor that is activated while the expander is not operating and is deactivated when the expander is operating.

14. The device according to claim 13, wherein the brake is a mechanical brake.

15. The device according to claim 13, wherein the rotor is mechanically coupled to a generator that, while the expander is not operating, is used as a brake by applying a direct current to the windings of the generator.

16. A method for controlling a device or expanding steam, whereby this device comprises an expander with an inlet that is connected to an inlet pipe and an outlet that is connected to an outlet pipe and a rotor for converting steam energy into mechanical energy on the shaft of the rotor, whereby the method comprises the step of closing the inlet valve and the outlet valve when the expander is not operating, wherein during the aforementioned step the method consists of supplying steam to the closed space between the inlet valve and the outlet valve that contains the expander and, whereby for the steam supply to the aforementioned space, steam is tapped off from the inlet pipe and/or from the outlet pipe.

17. The method according to claim 16, wherein condensate that occurs in the aforementioned space is removed at least while the expander is not operating.

18. The method according to claim 16, wherein the pressure in the aforementioned closed-off space, that contains the expander, and the ambient pressure are measured, the difference between the two pressures is determined, and that on the basis of the aforementioned difference the steam supply is increased or decreased to obtain an overpressure in the aforementioned space.

19. The method according to claim 16, wherein it prevents the rotor of the expander from being driven by the steam supply while the expander is not operating.

20. The method according to claim 19, wherein insufficient steam is supplied to the aforementioned space to drive the rotor of the expander.

21. The method according to claim 19, wherein steam is supplied to both the inlet and the outlet of the expander.

22. The method according to claim 19, wherein the shaft of the rotor is braked while the expander is not operating and is left free when the expander is operating.

* * * * *